Patented Apr. 29, 1952

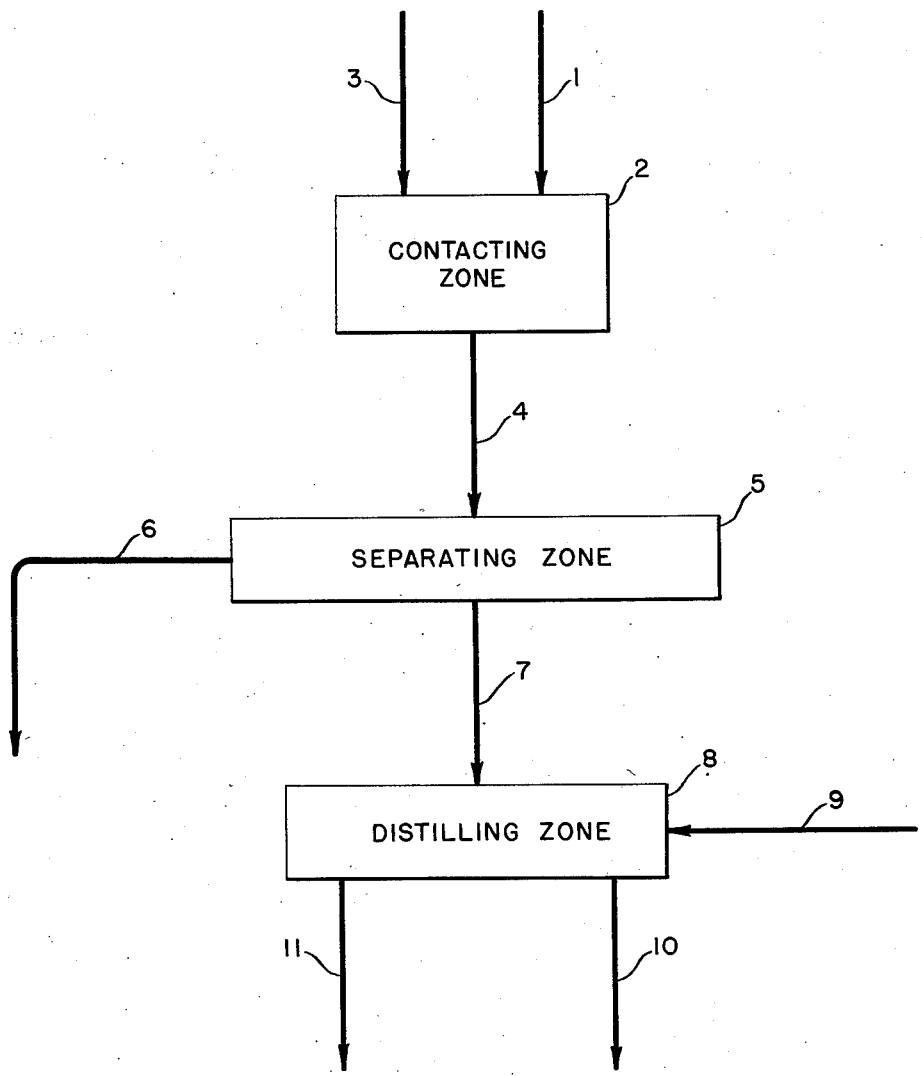

2,594,554

UNITED STATES PATENT OFFICE 2,594,554

PROCESS FOR CONCENTRATING HYDROGEN FLUORIDE

Olaf M. Hanson, Chicago, and Carl B. Linn, Riverside, Ill., assignors to Universal Oil Products Company, Chicago, Ill., a corporation of Delaware Application November 30, 1950, Serial No. 198,466

6 Claims. (Cl. 23—153)

This application is a continuation-in-part of our co-pending application Serial Number 731,398, filed February 27, 1947, now Patent No. 2,568,889, granted September 21, 1951.

This invention relates to a method for concentrating hydrogen fluoride from aqueous solutions of hydrogen fluoride.

An object of this invention is to produce hydrofluoric acid of higher hydrogen fluoride concentration from an aqueous solution of hydrogen fluoride.

One embodiment of this invention relates to a process for concentrating hydrofluoric acid which comprises contacting an aqueous solution of hydrogen fluoride with substantially anhydrous liquid hydrogen chloride in sufficient amount to form a more concentrated hydrofluoric acid layer and an aqueous hydrogen chloride layer and separating said concentrated hydrofluoric acid layer from said aqueous hydrogen chloride layer.

A further embodiment of this invention relates to a process for concentrating hydrofluoric acid from an aqueous solution thereof containing at least 90% by weight of HF which comprises contacting said aqueous solution with sufficient substantially anhydrous liquid hydrogen chloride to form a more concentrated hydrofluoric acid layer and an aqueous hydrogen chloride layer, separating said two layers, and fractionally distilling the more concentrated hydrofluoric acid layer in the presence of substantially anhydrous hydrogen chloride to obtain a distillate comprising essentially hydrofluoric acid of higher HF concentration than that charged to the process.

A still further embodiment of this invention relates to a process for concentrating hydrofluoric acid from an aqueous solution containing at least 95% by weight of HF which comprises contacting said solution with sufficient substantially anhydrous liquid hydrogen chloride to form a more concentrated hydrofluoric acid layer and an aqueous hydrogen chloride layer, separating said two layers, and fractionally distilling the more concentrated hydrofluoric acid layer in the presence of substantially anhydrous hydrogen chloride to obtain a distillate comprising essentially hydrofluoric acid of higher fluoride concentration than that charged to the process.

This process for concentrating hydrogen fluoride is effected by taking advantage of the low solubility of anhydrous liquid hydrogen fluoride in anhydrous hydrogen chloride and of the greater affinity for water of the hydrogen chloride. Our process is carried out by what might be termed an extraction as such or combined with distillation.

The use of our method makes it possible to recover hydrofluoric acid of high hydrogen fluoride concentration from aqueous solutions and sludges that previously could not be concentrated easily and economically and that contained sufficient hydrogen fluoride to present serious disposal problems. These solutions and sludges could be neutralized with caustic soda or by other means but the resultant sodium fluoride is also difficult to dispose of because of hazards to public health, fish, game, and the like, that prevail if these wastes are dumped into rivers, lakes, and other sources of water supplies.

Our process for removing water from aqueous solutions of hydrofluoric acid may be carried out by adding liquid anhydrous hydrogen chloride, vaporized anhydrous hydrogen chloride, or both liquid and vaporized hydrogen chloride to an aqueous hydrofluoric acid solution.

This process may be carried out as a liquid-liquid extraction at a temperature as low as the freezing point of the aqueous hydrogen fluoride solution that is extracted by substantially anhydrous hydrogen chloride. Depending upon the exact temperature used it may be necessary to carry out the extraction at a superatmospheric pressure in order to maintain the hydrogen chloride in substantially liquid phase. It is preferable to carry out the extraction at the autogeneous pressure developed by the hydrogen chloride and hydrogen fluoride present in the hydrogen fluoride concentrating system, although higher pressures may also be used. Constant boiling hydrofluoric acid freezes at about —35° C. while anhydrous hydrogen fluoride freezes at about —83° C. The freezing point of other hydrogen fluoride-water mixtures may be noted from the approximately straight line curve obtained by plotting the composition versus freezing point based upon the above indicated values and the freezing point of pure water.

After liquid hydrogen chloride and aqueous hydrofluoric acid are contacted, the resultant mixture is passed to a settling chamber where two layers separate. One of these layers comprises hydrogen chloride and most of the water introduced with the aqueous hydrofluoric acid and the other layer consists of hydrofluoric acid having a higher hydrogen fluoride content than that of the aqueous hydrofluoric acid introduced to the process. In this separation of the two layers, one comprising aqueous hydrogen chloride and the other a more concentrated hydrofluoric acid, it is difficult to predict which will be the upper layer and which the lower layer because of the fact that the specific gravity of each of these layers depends upon the temperature employed and upon the HCl and HF concentrations of the layers. In some instances, the more concentrated hydrofluoric acid comprises the upper layer while the aqueous hydrogen chloride formed by commingling anhydrous hydrogen chloride with water present in the charged aqueous hydrofluoric acid forms the heavy lower layer. However, at some temperature and concentration ranges, the aqueous hydrogen chloride layer may be the upper layer and the hydrofluoric acid layer may be the lower layer.

The method of removing water from aqueous solutions of hydrogen fluoride by our method is illustrated diagrammatically in the attached drawing which represents one method by which this embodiment of our invention may be carried out.

An aqueous solution of hydrogen fluoride from which water is to be removed is directed through line 1 to contacting zone 2 to which substantially anhydrous hydrogen chloride is also admitted through line 3. Contacting zone 2 may comprise any suitable mixing equipment such as a chamber containing baffles, a reactor provided with an efficient stirring means such as a turbomixer or any other apparatus suitable for contacting immiscible liquids. The resultant commingled mixture is then directed from contacting zone 2 through line 4 to separating zone 5 which comprises a vessel or series of vessels in which the commingled mixture may stand and separate into two layers, one comprising aqueous hydrogen chloride and the other comprising hydrofluoric acid with a higher hydrogen fluoride concentration than that present in the aqueous hydrogen fluoride originally charged through line 1. In some cases the hydrogen chloride layer which is withdrawn from separation zone 5 through line 6 may be fractionated to recover substantially anhydrous hydrogen chloride therefrom. Such recovered hydrogen chloride may be recycled, by means not indicated in the drawing, to further use in contacting zone 2. The more concentrated hydrofluoric acid layer is withdrawn from separating zone 5 through line 7 to distilling zone 8 which may comprise a fractional distilling column provided with a reboiler coil or other suitable heating means not illustrated in the drawing. Distilling zone 8 may also be provided with line 9 through which substantially anhydrous hydrogen chloride is added during the distillation as a means of effecting further concentration of the hydrofluoric acid being distilled therein. From distilling zone 8 the more concentrated hydrofluoric acid resulting from this concentrating process is directed through line 10 to storage or to other use not indicated in the drawing. A residue comprising aqueous hydrogen chloride solution and small amounts of hydrofluoric acid is also discharged from distilling zone 8 through line 11 to waste, storage or further use not indicated in the drawing.

In some cases, the hydrofluoric acid layer obtained from separating zone 5 and discharged therefrom through line 7 may be of sufficient hydrogen fluoride concentration that further distillation is unnecessary for the purpose in which said hydrofluoric acid layer is to be further utilized. Under these circumstances, our method of concentrating aqueous hydrofluoric acid may be carried out in the two steps of contacting with anhydrous hydrogen chloride and separating the contacting material into two layers in separating zone 5 without further distillation of either of said layers.

The process may also be operated at a superatmospheric pressure. It is sometimes desirable to have the pressure sufficiently high that the hydrogen chloride in the overhead fraction separates out as a liquid phase which is immiscible with the substantially anhydrous hydrogen fluoride phase also derived from the overhead fraction.

It is also possible to use hydrogen bromide or hydrogen iodide instead of hydrogen chloride to thus dehydrate aqueous hydrogen fluoride. However, the cost of hydrogen bromide or hydrogen iodide would probably make their use unprofitable.

The nature of the present invention is indicated further by the following example which should not be construed to limit the broad scope of the invention.

100 grams of an aqueous solution containing 95% HF and 5% water and 100 grams of anhydrous hydrogen chloride are contacted in a turbomixer at a temperature of 10° C. for 30 minutes. The resultant mixture is then placed in a settler and the two layer system is separated into a hydrofluoric layer containing 98% HF and an aqueous hydrogen chloride layer.

We claim as our invention:

1. A process for concentrating hydrofluoric acid which comprises contacting an aqueous solution of hydrogen fluoride with another substantially anhydrous liquid hydrogen halide in sufficient amount to form a more concentrated hydrofluoric acid layer and an aqueous hydrogen halide layer, and separating said more concentrated hydrofluoric acid from said aqueous hydrogen halide layer.

2. A process for concentrating hydrofluoric acid which comprises contacting an aqueous solution of hydrogen fluoride with substantially anhydrous liquid hydrogen chloride in sufficient amount to form a more concentrated hydrofluoric acid layer and an aqueous hydrogen chloride layer, and separating said concentrated hydrofluoric acid layer from said aqueous hydrogen chloride layer.

3. A process for concentrating hydrofluoric acid from an aqueous solution thereof containing at least 90% by weight of HF which comprises contacting said aqueous solution with sufficient substantially anhydrous liquid hydrogen chloride to form a more concentrated hydrofluoric acid layer and an aqueous hydrogen chloride layer, and separating said two layers.

4. A process for concentrating hydrofluoric acid from an aqueous solution thereof containing at least 95% by weight of HF which comprises contacting said aqueous solution with sufficient substantially anhydrous liquid hydrogen chloride to form a more concentrated hydrofluoric acid layer and an aqueous hydrogen chloride layer, and separating said two layers.

5. A process for concentrating hydrofluoric acid from an aqueous solution thereof containing at least 90% by weight of HF which comprises contacting said aqueous solution with sufficient substantially anhydrous liquid hydrogen chloride to form a more concentrated hydrofluoric acid layer and an aqueous hydrogen chloride layer, separating said two layers, and fractionally distilling the more concentrated hydrofluoric acid layer in the presence of substantially anhydrous hydrogen chloride to obtain a distillate comprising essentially hydrofluoric acid of higher HF concentration than that charged to the process.

6. A process for concentrating hydrofluoric acid from an aqueous solution containing at least 95% by weight of HF which comprises contacting said solution with sufficient substantially anhydrous liquid hydrogen chloride to form a more concentrated hydrofluoric acid layer and an aqueous hydrogen chloride layer, separating said two layers, and fractionally distilling the more concentrated hydrofluoric acid layer in the presence of substantially anhydrous hydrogen chloride to obtain a distillate comprising essentially hydrofluoric acid of higher hydrogen fluoride concentration than that charged to the process.

OLAF M. HANSON.
CARL B. LINN.

REFERENCES CITED

The following references are of record in the file of this patent:

UNITED STATES PATENTS

| Number | Name | Date |
| --- | --- | --- |
| 2,345,696 | Benning | Apr. 4, 1944 |
| 2,355,857 | Hachmuth | Aug. 15, 1944 |
| 2,413,205 | Word | Dec. 24, 1946 |

FOREIGN PATENTS

| Number | Country | Date |
| --- | --- | --- |
| 357,438 | Great Britain | Sept. 24, 1931 |